United States Patent [19]

Busboom

[11] Patent Number: 4,684,068

[45] Date of Patent: Aug. 4, 1987

[54] DUAL ROTATING SPREADERS FOR HARVESTER DISCHARGE

[75] Inventor: Garry W. Busboom, Independence, Mo.

[73] Assignee: Deutz-Allis Corporation, Milwaukee, Wis.

[21] Appl. No.: 819,628

[22] Filed: Jan. 17, 1986

[51] Int. Cl.⁴ .................... A01C 17/00; B05B 1/28
[52] U.S. Cl. ...................... 239/665; 239/288.5; 239/684; 239/687
[58] Field of Search .................... 239/288–288.5, 239/661, 665, 667, 670, 673, 677, 681–684, 687

[56] References Cited

U.S. PATENT DOCUMENTS

| | | | |
|---|---|---|---|
| 1,462,387 | 7/1923 | Slade | 239/682 |
| 1,769,302 | 7/1930 | MacGregor | 239/665 |
| 1,770,707 | 7/1930 | McDow | 239/673 |
| 1,815,042 | 7/1931 | Bartels | 198/642 |
| 3,220,740 | 11/1965 | Kavan et al. | 239/687 |
| 3,368,762 | 2/1968 | Dreyer | 239/682 X |
| 3,539,113 | 11/1970 | Tyler | 239/673 |
| 4,031,929 | 6/1977 | Cobb et al. | 239/684 |
| 4,292,795 | 10/1981 | Linn | 56/503 |
| 4,383,536 | 5/1983 | Delorme | 239/677 X |
| 4,549,697 | 10/1985 | Manon | 239/681 |

FOREIGN PATENT DOCUMENTS

| | | | |
|---|---|---|---|
| 50574 | 1/1941 | Netherlands | 239/684 |
| 6610697 | 1/1968 | Netherlands | 239/667 |
| 6717386 | 6/1968 | Netherlands | 239/687 |

Primary Examiner—Andres Kashnikow
Assistant Examiner—Patrick N. Burkhart
Attorney, Agent, or Firm—Charles L. Schwab

[57] ABSTRACT

The crop material or straw discharged from the rear of a combine is spread by a pair of counterrotating spreaders which are vertically and laterally offset from one another and are operative to evenly spread the crop material over a header cut of substantial width. The speed of rotation of the spreaders can be adjusted to change the width of spread. The spreaders can also be adjusted to make them more or less aggressive in throw of discharged crop material. The bottom spreader uses a disc and blades to facilitate catching and spreading discharged material.

17 Claims, 10 Drawing Figures

DUAL ROTATING SPREADERS FOR HARVESTER DISCHARGE

This invention relates to spreaders for crop material discharged from harvesters and more particularly to a spreader arrangement wherein two spreaders are employed to effect the desired distribution of crop material.

OBJECTS AND SUMMARY OF THE INVENTION

It is an important object of this invention to provide a spreader mechanism which evenly distributes crop material discharged by a mobile harvester over the width of the cut made by the harvester header.

It is a further object of this invention to provide a straw spreader for a crop material discharge opening offset from the centerline of the combine which evenly distributes the crop material over the width of cut of the harvester header.

It is a further object of this invention to provide a spreader mechanism for a combine or the like which properly spreads discharged crop material of a wide variety of crops such as wheat, oats, corn, soy beans and sorghum.

This invention provides a dual spreader arrangement for spreading crop material discharged from a downwardly open discharge opening at the rear of an agricultural harvester. A first of the two spreaders is supported on the harvester by a first shaft on a first generally upright axis near the discharge opening and has a plurality of angularly spaced and radially extending impeller paddles connected to and rotating with the first shaft with vertical open spaces between the paddles. The paddles pass below the discharge opening as the first spreader rotates and the paddles cause some discharged material to be distributed to one lateral side of the swath cut by the header of the combine. Some crop material passes downwardly between the paddles. A second spreader of the dual spreader arrangement includes a second upright shaft rotatably supported on the harvester on a second axis which is spaced laterally from the axis of the first spreader. A disc is coaxially connected to and rotates with the bottom end of the second shaft and a plurality of angularly spaced blades are connected for rotation with the second shaft and extend generally radially therefrom. The blades are disposed on top of the disc and the disc and blades are spaced below the impeller paddles of the first spreader. A portion of the disc is disposed beneath the discharge opening. A substantial portion of the discharged crop material passing between the paddles of the first spreader fall onto the disc of the second spreader and the blades of the second spreader fling the material to the other lateral side of the combine as the material slides radially off the disc. The paddles and blades may be repositioned to render the spreaders more or less aggressive in their ability to throw crop material. A suitable drive means is provided to rotate the spreaders in opposite directions. Speed changing means may be included to change the width of spread to match the width of the header used on the combine.

BRIEF DESCRIPTION OF THE DRAWINGS

One embodiment of the invention is illustrated in the drawings in which.

DETAILED DESCRIPTION OF THE DRAWINGS

Figure 1:
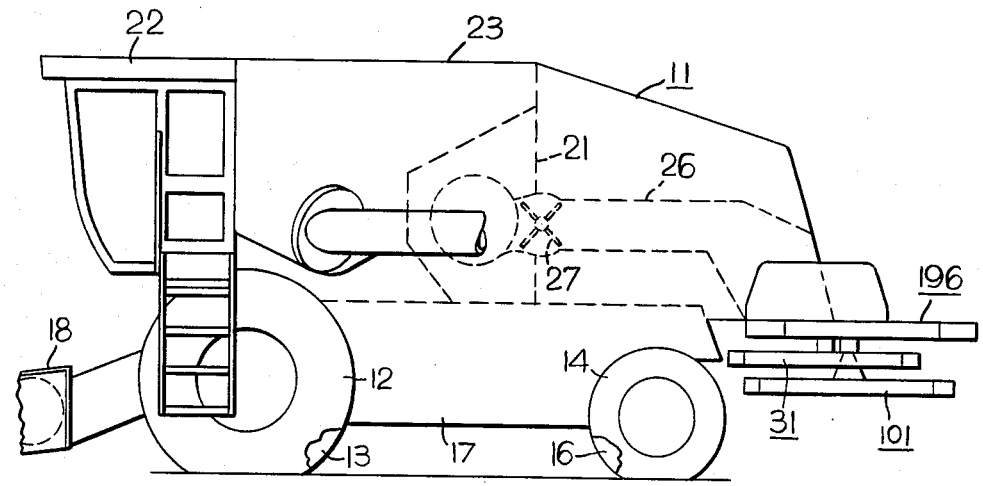
FIG. 1 is a side view of a self-propelled combine in which the present invention is incorporated.
Figure 2:
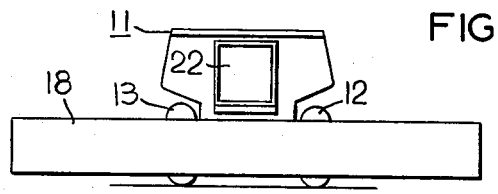
FIG. 2 is a reduced front view of the combine shown in FIG. 1.
Figure 3:
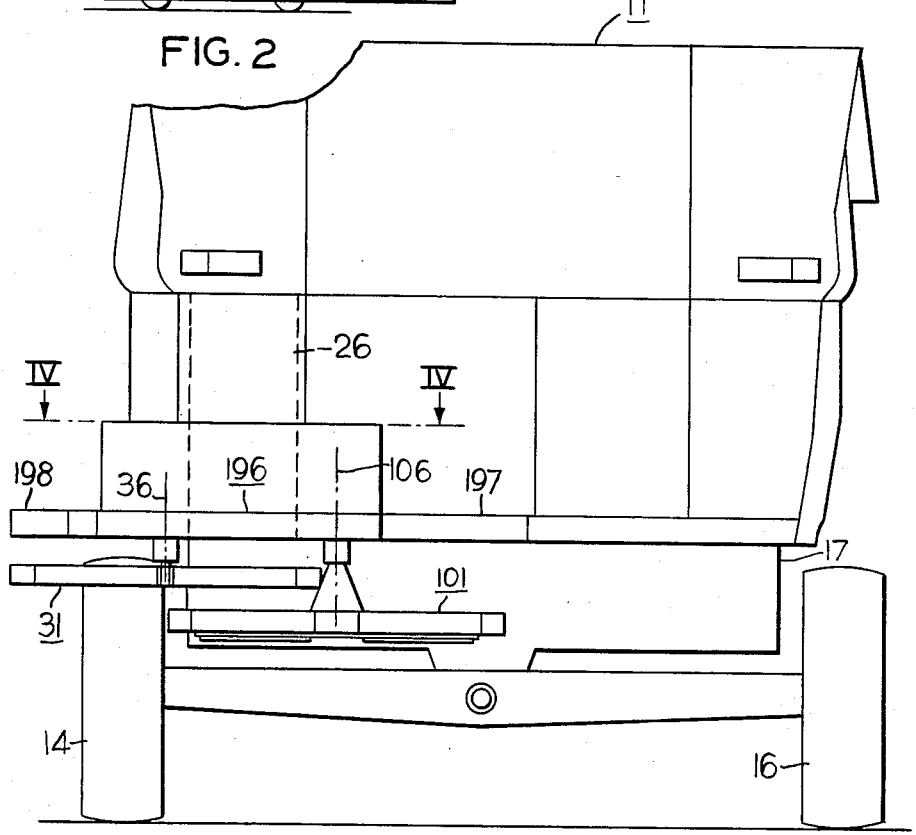
FIG. 3 is an enlarged rear view of the combine shown in FIG. 1.

Referring to FIGS. 1-3 of the drawings, the dual spreader arrangement of this invention is incorporated in a self-propelled agricultural harvester in the form of a combine 11. The combine 11 has a pair of front drive wheels 12, 13 and a pair of rear steerable wheels 14, 16 supporting a main frame 17. The main frame 17 supports a transversely extending header 18 at its front end and a crop processor or threshing section 21 on its central portion. An operator's cab 22 is mounted on the front part of the frame 17 and a grain bin 23 for receiving clean grain is mounted on the frame 17 between the cab 22 and the processor 21. Crop material is conveyed from the header 18 to the processor 21 by appropriate conveying means, not shown, where the grain is separated from the crop material. The crop material separated from the grain is thrown rearwardly through a discharge chute 26 by an impeller 27.

Figure 4:
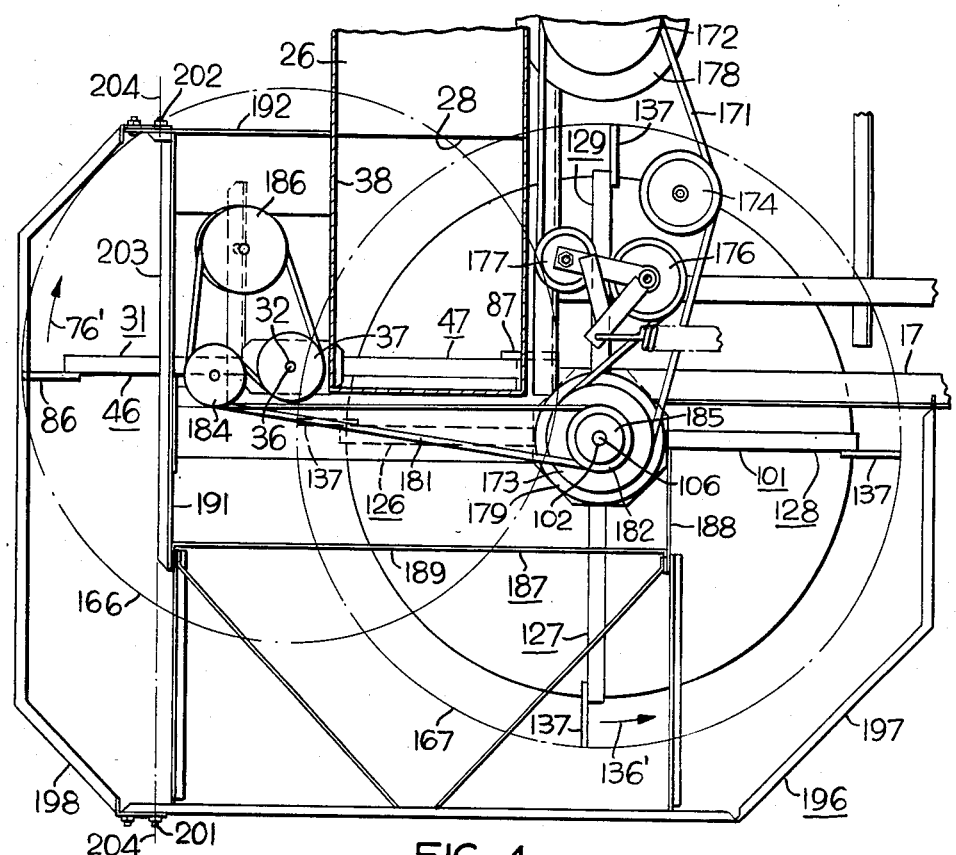
FIG. 4 is an enlarged view taken along the line IV—IV in FIG. 3.
Figure 5:
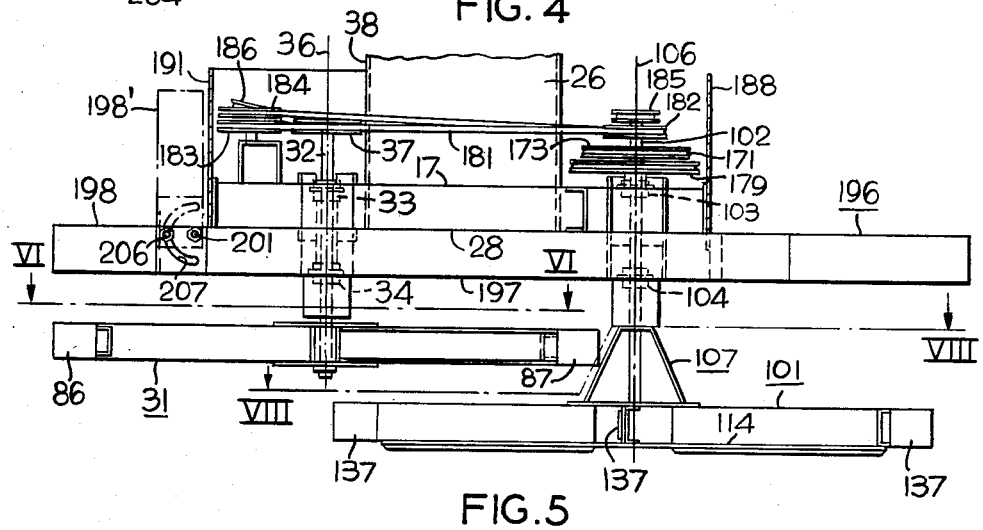
FIG. 5 is an enlarged partial rear view of the combine of FIG. 1 with parts broken away for illustration purposes.

Referring also to FIGS. 4 and 5, the crop material thrown rearwardly through the discharge chute 26 falls by gravity through a downwardly open rectangular discharge opening 28, where it is engaged by a unique dual spreader arrangement. The dual spreader arrangement includes a first spreader 31 having an upright shaft 32 rotatably mounted on the combine frame 17 by a pair of aligned bearings 33, 34 for rotation about an upright axis 36.

Figure 6:
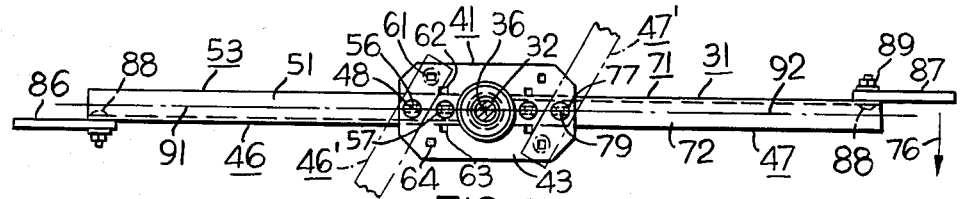
FIG. 6 is a view taken along the line VI—VI in FIG. 5.
Figure 7:
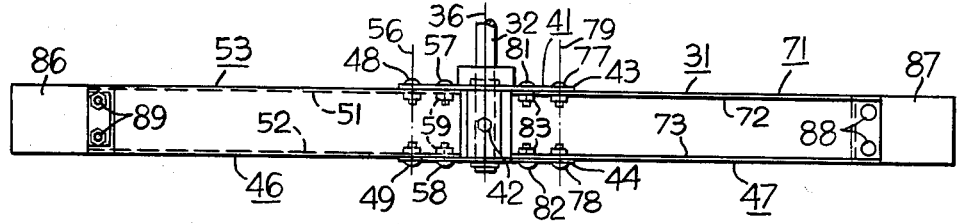
FIG. 7 is an elevation view of one of the structures shown in FIG. 6.

The shaft 32 and a V-belt pulley 37 secured to its upper end are disposed on the left-hand side of the side wall 38 of the discharge chute 26 and close to the left rear corner of the discharge opening 28. As shown in FIGS. 6 and 7, the discharge spreader 31 includes a hub 41 secured by a bolt 42 to the lower end of the shaft 32. The hub 41 includes parallel horizontal upper and lower plates 43, 44 to which a pair of impeller paddles 46, 47 are connected so as to rotate with the shaft 32. The paddle 46 is pivotally connected to the plates 43, 44 by a pair of aligned pivot bolts 48, 49 which extend through openings in the upper and lower flanges 51, 52 of the channel part 53 of the paddle 46 and aligned openings in the plates 43, 44. Five sets of vertically aligned holes are formed in the plates 43, 44 and are circumferentially spaced on an arc of a circle whose center is on the axis 56 of the pivot bolts 48, 49. Releasable fastening means in the form of bolts 57, 58 and nuts 59 secure the radially inner end of the channel part 53 to the plates 43, 44, the bolts passing through one of the five sets of aligned holes. The upper holes 61, 62, 63, 64 of the other four sets of aligned holes are shown in FIG. 6. Channel part 71 similarly has flanges 72, 73 extending horizontally from its web in the direction of rotation, indicated by an arrow 76, of the spreader 31, and the flanges 72, 73 are adjustably connected to the horizontal plates 43, 44 of the hub 41 by pivot bolts 77, 78 aligned on a pivot axis 79 and by releasable fastening means in the form of aligned bolts 81, 82 and nuts 83. The axes 56, 79, about which the paddles 46, 47 are pivotably adjustable, are spaced radially outward an equal distance from the axis 36 of the spreader 31 on diametrically opposite sides thereof. The paddles have rectangular shaped end portions or tips 86, 87 releasably secured to the vertical webs of the channel parts 53, 71 by bolts 88 and nuts 89. The radially outer tips 86, 87 are made of flexible rubber-like material such as the carcass of a tire. As shown in solid lines in FIG. 6, the paddles 46, 47 are diametrically opposite one another and extend radially from the axis 36 in general alignment with radial lines 91, 92. Pivotally adjusted positions of the paddles are shown by broken lines 46' and 47' in which the blades have been pivoted about their pivot axes 56, 79 to angularly adjusted operating positions relative to the radial lines 91, 92. In other words, in the adjusted positions represented by broken lines 46', 47', the paddles are not in radial relation to the spreader axis 36.

Figure 10:
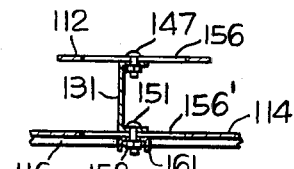
FIG. 10 is a view taken along the line X—X in FIG. 9.
Figure 8:
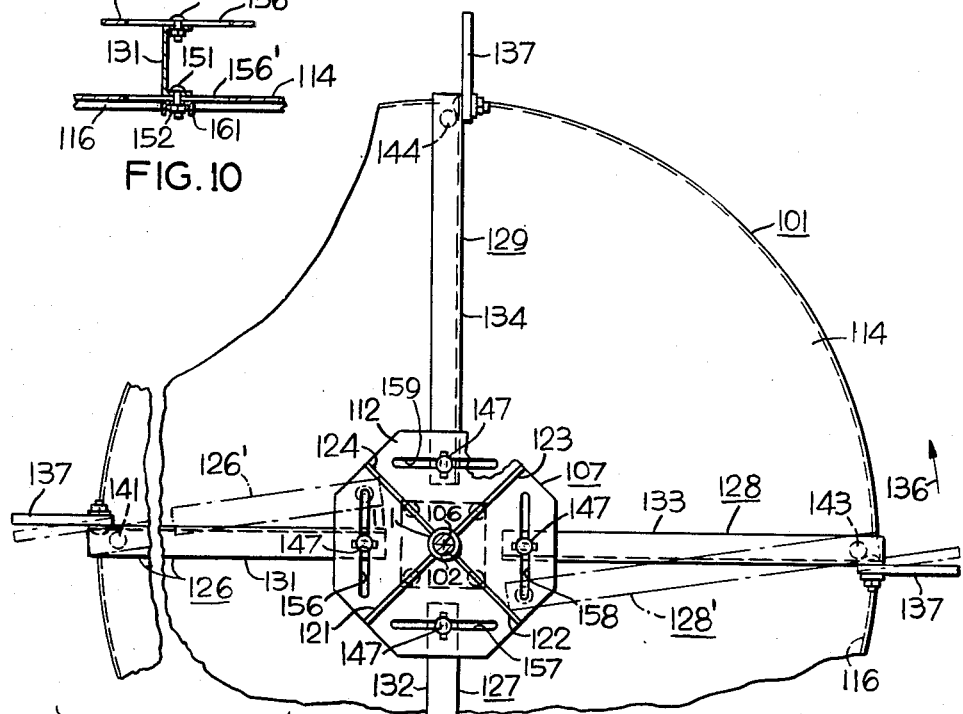
FIG. 8 is a view taken along the line VIII—VIII in FIG. 5.
Figure 9:
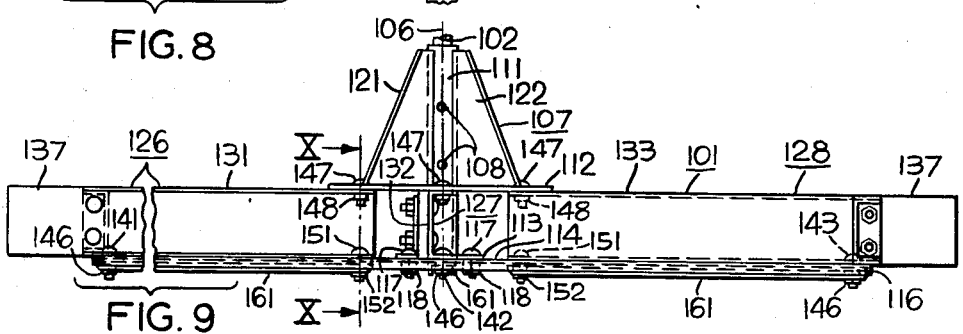
FIG. 9 is an elevation view of the structure shown in FIG. 8.

The spreader arrangement of this invention includes a second spreader 101 having an upright shaft 102 pivotally supported on the combine frame 17 by a pair of aligned bearings 103, 104 for rotation about an upright axis 106 which is parallel to and spaced laterally inward and rearward of the axis 36 of the spreader 31. As shown in FIG. 4, the shaft 102 of the spreader 101 is near the right rear corner of the discharge opening 28. As illustrated in the drawings, the parallel and laterally spaced spreader shafts 32 and 102 are disposed on laterally opposite sides of the laterally opposite upright side walls of the discharge chute 26. By placing the shafts 32, 102 and their support bearings outside of the discharge chute, the shafts and bearings do not interfere with the flow of discharged material and the bearings are less subject to foreign material. A hub 107 is secured to the lower part of the shaft 102 by pins 108. As shown in FIGS. 8-10, the hub 107 includes an upright sleeve 111 to which upper and lower horizontal plates or radial flanges 112, 113 are welded in parallel relation to one another. A horizontal flat disc 114, having a downwardly extending peripheral lip 116 at its circumference, is releasably secured to the lower flange 113 by bolts 117 and nuts 118 for coaxial rotation with the sleeve 111 about the upright axis 106. The upper flange 112 is reinforced by angularly spaced radial gussets 121-124 welded to the sleeve 111 and to the horizontal flange 112. The second spreader 101 has four blades 126-129 which are similar to the paddles 46, 47 used in the spreader 31. The upper and lower flanges of the channels 131-134 of the blades 126-129 extend horizontally from the webs thereof in the direction of rotation of the spreader 101, indicated by an arrow 136 in FIG. 8. A flexible end part or tip 137 is releasably secured to the radially outer end of each of the channels 131-134 and these tips extend radially beyond the disc 114. The radially outer ends of the lower flanges of the channels 131-134 are connected to the disc near its radially outer extremity or circumference by upright pivot bolts 141-144 and nuts 146. The radially inner ends of the upper flanges of the channels 131-134 are releasably secured to the upper plate 112 of the hub 107 by bolts 147 and nuts 148 and the radially inner ends of the lower flanges of the channels 131-134 are releasably secured to the disc 114 by bolts 151 and nuts 152. The bolts 147 extend through slots 156-159 in the plates 112 and the bolts 151, which are vertically aligned with the bolts 147, extend through slots in the disc 114. FIG. 10 shows a slot 156' in the disc 114 through which a bolt 151 extends. The blades 126-129 may be pivotally adjusted about the upright axes of the pivot bolts 141-144 by loosening the nuts 148, 152 and swinging the radially inner end of the blades to one side or the other of radial lines from the axis 106 through the axes of the pivot bolts 141-144. Adjusted positions for paddles 126 and 128 are shown by broken lines 126' and 128'. The bolts 147 and 151 extend through slots in the channel flanges which are elongated radially in relation to the spreader axis 106, thus permitting the bolts to slide in the slots 156-159 formed in the plate 112 and the slots in plate 114, which are in vertical alignment with the slots 156-159. The spreader 101 is reinforced by four channels 161 secured beneath the disc 114 vertically below the channels 131-134. The channels are secured in place by the bolts 141-144, the bolts 151 and the nuts threadedly engaging such bolts.

Referring to FIGS. 4 and 5, the spreaders 31, 101 are driven in opposite directions indicated by arrows 76' and 136', respectively. The circular path of the radial extremity of the paddles 46, 47 is indicated by broken line 166 and the path of the radially outer edge of the tips of the blades 126-129 is illustrated by the broken lines 167. The drive means for rotating the spreader 101 includes a V-belt 171 engaging a drive sheave 172 and a driven sheave 173 secured to the shaft 102. Nonadjustable idlers 174, 176 and a spring biased tensioning idler 177 are provided for the V-belt 171. Speed adjusting means are provided by including a second and larger diameter drive sheave 178 and a second and larger diameter sheave 179 on the spreader shaft 102. This speed adjusting means permits the shaft 102 to be driven at four different speeds. By positioning the drive belt 17 on sheaves 172 and 179, the shaft 102 is driven at the lowest speed. By positioning the belt 171 on sheaves 172 and 173, as illustrated, the shaft 102 is driven at the next-to-lowest speed. By positioning the belt 171 on sheaves 178 and 179, the shaft 102 is driven at a next-to-highest speed, and by positioning the belt 171 on sheaves 178 and 173, the shaft is driven at the highest speed. These speed adjustments permit the operator to change the width of spread to match the cutting width of the header used on the combine. Drive means for rotating the spreader 31 includes a V-belt 181 engaging a sheave 182 on spreader shaft 102, nonadjustable idlers 183, 184, the driven sheave 37 on the shaft 32 and an idler 186 which is adjustable in the fore and aft direction of the combine to tension the V-belt 181. Since the sheaves 37 and 182 are the same diameter, the spreaders 31 and 101 are driven at the same speed. A speed adjusting means in the form of a smaller diameter sheave 185 on the shaft 102 is provided to permit the spreader 31 to be driven at a slower speed than the spreader 101. Changing the speed of the spreader 31 relative to the spreader 101 changes the proportion of crop material spread by the spreader 31 and changes the width of spread effected by the spreader 31. A shield 187 having side walls 188, 189, 191, 192, but which is open at the top and bottom, is disposed in protective relation to the drive belts, sheaves and idlers.

A guard rail structure 196 is secured to the rear of the frame 17 of the combine at a level above the paddles 46, 47 and blades 126–129 so as not to interfere with the spreading operation of the spreaders 31, 101. The guard rail structure 196 includes a fixed guard rail part 197 and a swing-up guard rail part 198. The swing-up guard rail part 198 is pivotally connected by aligned pivot bolts 201, 202 to the stationary or fixed guard rail part 196 and a brace 203 for pivotal movement about a horizontal longitudinal axis 204 between the normal horizontal position occupied during a harvesting operation, shown in solid lines in FIGS. 4 and 5, and a foldup transport position alongside the harvester, shown by broken lines 198′ in FIG. 5. As shown in FIG. 5, an abutment bolt 206 on the fixed guard rail part 196 engages the upper end of an arcuate slot 207 when the guard rail part 198 is in its horizontal operating position and engages the opposite end of the slot when the guard rail part 198 is swing upward and laterally inward to its upright transport position shown by broken lines 198′. A similar abutment bolt and arcuate slot are provided for the front end of the foldable guard rail part 198. When the combine is transported on a truck, the header 18 is removed and the guard rail part 198 is folded up to its transport position thus reducing the overall width of the remaining part of the combine.

During a harvesting operation, crop material from which the grain has been removed, is discharged downwardly through the discharge opening 28. As seen in FIG. 4, the path of the paddles 46, 47 of the spreader 31 pass beneath the opening 28 and, thus, are operative to engage some of the discharged crop material and distribute it rearwardly and to the left-hand side of the combine. The channel shape of the paddles 46, 47 helps them catch some of the crop material which slides off the paddles as they rotate rearwardly and then laterally outwardly from their respective positions beneath the discharge opening 28. The spreader 31 can be made more or less aggressive in its ability to temporarily hold material on the paddles 46, 47 by adjusting the latter about their pivot bolt axes 56, 79 as previously described. Moving the paddles to the adjusted positions shown by broken lines 46′, 47′ will reduce the lateral width of spreading because most of the material will slide off the paddles as they swing rearwardly. A large portion of the discharged material will pass downwardly between the paddles 46, 47 of the spreader 31 and will be engaged by the blades 126–129 of the spreader 101. The disc 114 catches some of the material which might otherwise fall to the ground and as the spreader 101 rotates, the crop material will be engaged by the blades 126–129 and flung rearwardly and laterally to the right-hand side of the combine. The channel shape of the blades 126–129 helps to insure that the material passes outwardly along the leading side of the blades 126–129 and is given its final impetus by the tips 137 of the blades 126–129. The blades can be rendered more or less aggressive to vary the width of spread of the discharged crop material by adjusting the blades about their pivot bolts 141–144 as hereinbefore described. As hereinbefore described, also, the speed of the spreaders can be changed to spread material over the width of cut effected by different width headers available to combine users. FIG. 2 illustrates a relatively wide combine header.

The illustrated embodiment of the invention is particularly suited to distribute the discharged crop material over the width of cut of the combine header 18 even though the crop discharge opening is disposed to one lateral side of the combine. The spreader 31 without two paddles, and with a disc, allows a substantial portion of the discharged crop material to pass to the second spreader 101 disposed at a level below the spreader 31. The paths 166 and 167 of the spreaders 31, 101 pass beneath major portions of the discharge opening to efficiently distribute the discharged crop material in a relatively even manner. Even distribution of the discharged crop material over the width of the cut of the header is desirable for subsequent farming operations such as tillage or planting and is desirable from the standpoint of having an even ground cover if the land is to lie fallow.

The embodiment of the invention in which an exclusive property or privilege is claimed are defined as follows:

1. A dual spreader arrangement for spreading the crop material discharged from a downwardly open discharge opening at the rear of an agricultural harvester comprising:

a first spreader having a first generally upright shaft rotatably supported on said harvester on a first axis near said discharge opening including a plurality of angularly spaced and radially extending impeller paddles connected to and rotating with said first shaft, said first spreader having vertical open spaces between said impeller paddles and said impeller paddles passing below said discharge opening during rotation, a second spreader having a second generally upright shaft rotatably supported on said harvester on a second axis spaced laterally from said first axis, a disc coaxially connected to and rotating with the bottom end of said second shaft and a plurality of angularly spaced blades extending generally radially from and connected for rotation with said second shaft, said blades being disposed on top of said disc, a portion of said disc being disposed beneath said discharge opening and said disc and blades being below said impeller paddles whereby a substantial portion of discharged crop material passing between said impeller paddles falls on said disc and drive means operable to rotate said shafts in opposite directions including first speed adjusting means operable to effect multiple speed operation of said spreaders and second speed adjusting means operable to change the speed of said first spreader relative to said second spreader.

2. The dual spreader arrangement of claim 1 wherein said second axis is disposed rearwardly of said first axis.

3. The dual spreader arrangement of claim 1 wherein said impeller paddles are angularly adjustable relative to radial lines extending outwardly from said one axis.

4. The dual spreader arrangement of claim 1 wherein the radial outer end portions of said impeller paddles are flexible.

5. The dual spreader arrangement of claim 1 wherein said blades extend radially outward at least to the circumference of said disc.

6. The dual spreader arrangement of claim 5 wherein flexible ends are secured to the radially outer ends of said blades and extend beyond the circumference of said disc.

7. The dual spreader arrangement of claim 1 wherein said blades of said second spreader pass beneath said discharge opening during rotation of said second spreader and a substantial portion of said discharge opening is in overlying relation to said disc.

8. In a mobile agricultural harvester for separating grain from crop material having a discharge chute at one lateral side of its rear end for discharge of crop material separated from the grain including a pair of laterally spaced upright side walls and a downwardly open crop material discharge opening at the rear end of said chute, a dual spreader apparatus comprising:
   a first spreader having
      a first generally upright shaft rotatably supported on said one lateral side of said harvester and at the laterally outer side of said discharge opening and discharge chute for rotation about a first upright axis and
      a plurality of angularly spaced and radially extending impeller paddles connected to the lower end of and rotating with said first shaft in a path passing beneath said discharge opening,
   a second spreader having
      a second generally upright shaft rotatably supported on said harvester at the other lateral side of said discharge opening and discharge chute for rotation on a second generally upright axis,
      a disc connected coaxially to the lower end of said second shaft for rotation with the latter, and
      a plurality of angularly spaced blades extending radially from and connected for rotation with said lower end of said shaft in a path below said discharge opening and vertically below and underlapping said path of said paddles, said blades being disposed on top of and extending upwardly from said disc, the lateral extent of the discharge opening being substantially within the lateral extent of the underlap of the path of said paddles, and
   drive means operable to rotate said shafts in opposite directions.

9. The harvester of claim 8 wherein said second axis is parallel to and disposed rearwardly of said first axis.

10. The harvester of claim 8 wherein said paddles are selectively adjustable from radial positions relative to said first axis to positions which are not radial in relation to said first axis whereby the spreading width capability of said first spreader can be selectively adjusted.

11. The harvester of claim 10 wherein said blades are selectively adjustable from positions in which they radiate from said second axis to positions in which their vertical planes are spaced from said second axis whereby the agressiveness of said second spreader may be selectively changed.

12. The harvester of claim 8 wherein said blades are pivotally connected on upright axes to the radially outer portion of said disc and means are provided for changing the positions of the radially inner portions of said blades whereby the angular relationship of the blades relative to radial lines from said second axis may be selectively changed.

13. The harvester of claim 8 wherein said second spreader includes a hub secured to the lower end of said second shaft and presenting a bottom radial flange and an upper radial flange and further comprising fastening means rigidly securing said disc to said lower flange, means pivotally connecting said blades at circumferentially spaced points on said radially outer portion of said disc for swinging movement about vertical axes and releasable fastening means operatively associated with the radially inner ends of said blades and said hub permitting said blades to be releasably secured to the latter in selected positions of angularity relative to lines radiating from said second axis.

14. The harvester of claim 13 wherein said second spreader includes at least two paddles, each of which includes a horizontal flange along its top extending in the direction of rotation of said second spreader.

15. In a mobile agricultural harvester for separating grain from crop material having a downwardly open crop material discharge opening at one lateral side of its rear end, a dual spreader apparatus comprising:
   a first spreader having
      a first generally upright shaft rotatably supported on said one lateral side of said harvester and at the laterally outer side of said discharge opening for rotation about a first upright axis and
      a plurality of angularly spaced and radially extending impeller paddles connected to the lower end of and rotating with said first shaft in a path passing beneath said discharge opening,
   a second spreader having
      a second generally upright shaft rotatably supported on said harvester at the other lateral side of said discharge opening for rotation on a second generally upright axis,
      a disc connected coaxially to the lower end of said second shaft for rotation with the latter, and
      a plurality of angularly spaced blades extending radially from and connected for rotation with said lower end of said shaft in a path below said discharge opening and vertically below and underlapping said path of said paddles, said blades being disposed on top of and extending upwardly from said disc,
   drive means operable to rotate said shafts in opposite directions and
   a guard rail structure secured to the rear part of said harvester and extending about said spreader apparatus at a level above said paddles and blades so as not to interfere with the spreading operation thereof, said guard rail structure including a fixed guard rail part and a swing-up guard rail part pivotally secured to said one lateral side of said harvester for pivotal movement about a longitudinal pivot axis between a normal horizontal position occupied during a harvesting operation and a vertical foldup transport position alongside said one side of said harvester.

16. In an agricultural harvester having means for separating grain from crop material including a discharge chute with laterally spaced upright walls extending rearwardly and downwardly to a downwardly open discharge opening, a dual spreader arrangement for spreading the crop material discharged from the downwardly open discharge opening comprising:
   a first spreader having a first generally upright shaft rotatably supported on said harvester on a first axis near said discharge opening but outside of said discharge chute including a plurality of angularly spaced and radially extending impeller paddles connected to and rotating with said first shaft, said first spreader having vertical open spaces between said impeller paddles and said impeller paddles passing below said discharge opening during rotation, a second spreader having a second generally upright shaft rotatably supported on said harvester on a second axis spaced laterally from said first axis and disposed outside of said discharge chute, a disc coaxially connected to and rotating with the bottom end of said second shaft and a plurality of angularly spaced blades extending generally radially from and connected for rotation with said second shaft, said blades being disposed on top of said disc, a portion of said disc being disposed beneath said discharge opening and said disc and blades being below said impeller paddles whereby a substantial portion of discharged crop material passing between said impeller paddles falls on said disc, said path of said paddles overlapping said disc vertically below said discharge opening, the lateral extent of the discharge opening being substantially within the lateral extent of the overlap of the path of said paddles relative to said disc, means pivotally connecting the radially outer ends of each of said blades to circumferentially spaced points on the radially outer portion of said disc for angular adjustment of said blades about vertical axes at said points between a plurality of operating positions, releasable fastening means securing the radially inner end of each of said blades to said second spreader at a selected one of said operating positions and drive means operable to rotate said shafts in opposite directions.

17. The harvester of claim 8 wherein said drive means includes a speed adjusting means operable to change the speed of said first spreader relative to said second spreader.

* * * * *